United States Patent [19]

Applequist et al.

[11] 3,875,589

[45] Apr. 1, 1975

[54] MODULAR SERVO TRACK WRITER WITH LINEAR POSITIONING

[76] Inventors: Roy A. Applequist, 401 Edgewood Rd., Redwood City, Calif. 94062; Richard W. Rawie, 3197 Forbes Ave., Santa Clara, Calif. 95051

[22] Filed: Mar. 27, 1974

[21] Appl. No.: 455,414

[52] U.S. Cl. .................................................. 360/78

[51] Int. Cl. .......................................... G11b 21/08

[58] Field of Search ............ 360/78, 77, 106, 97, 98

[56] References Cited

UNITED STATES PATENTS 3,643,242 2/1972 Bryer .................................. 360/78

*Primary Examiner*—Vincent P. Canney
*Attorney, Agent, or Firm*—Schatzel & Hamrick

[57] ABSTRACT

A modular servo track writer machine with linear positioning for recording information on computer disk packs; the machine including a self-contained modular positioner with a screw-detent type mechanism which positioner is adapted for ready removability and replacement in the machine baseplate assembly and which modular positioner is self-aligning relative to the access mechanism; the access mechanism being a self-supporting unit with a carriage overhanging the head supporting tower on the side away from the spidle.

15 Claims, 5 Drawing Figures

MODULAR SERVO TRACK WRITER WITH LINEAR POSITIONING

BACKGROUND OF THE INVENTION

The present invention relates to a linear servo track writer and more particularly to a modular servo track writer with linear positioning. A linear servo track writer is a machine capable of accepting removable type disk packs to be mounted on an air bearing spindle, and includes linear access mechanism for precisely positioning magnetic heads in predetermined locations relative to the disk pack to allow for recording of the positioning tracks on the servo surface of the disk pack. The disk packs, after the servo information is recorded, may eventually be used in 3330 type disk drives to position precisely the access mechanism and also to follow the disk pack runout.

Most of the known linear servo track writers use a laser interferometer or some other distance measuring system, with high measuring accuracy, to follow the motion of an access mechanism. The distance information is then fed into an electromechanical positioning servo system. In such systems, a position of each servo track is recreated by the system every time a disk pack is being written or verified. Such servo writer systems have been found to be economically expensive and to require sophisticated maintenance. Also, the servo positioning into the extremely precise locations is very time consuming. This results in the expenditure of considerable time in order to write and verify a disk pack. This disadvantage of a long cycle time becomes more pronounced at higher track densities. Presently, industry demands call for future track densities in the order of more than 300 tracks per inch, and the long cycle times of prior art servo track writers impose limitations on production through-put of such systems.

SUMMARY OF THE INVENTION

In accordance with the present invention, all positioning functions for achieving proper track spacing are combined in a modular positioner that represents a removable self-contained unit. A system of a precision screw, nut and detenting mechanism or other mechanical positioning device are used in the modular positioner. The unit is easily removable from the servo track writer to readily permit replacement by another modular positioner that allows other track spacing as required.

A hollow nut shaft, rotation of which is controlled by a detent mechanism, is mounted for rotation in a positioner housing. Axial motion of the nut shaft is eliminated by the nut shaft being pushed by a constant force against a ball stop. The same constant force also provides a positive contact between the positioning nut shaft and the positioning screw to eliminate slack. A friction clutch and a detent mechanism rotate the nut shaft into predetermined angular positions such that the positioning screw moves axially in linear increments corresponding to the desired track locations on the servo surface of the disk pack. In order to minimize wear, the clutch-detent mechanism is submerged in oil and insulated by a housing and appropriate oil seals from the atmosphere.

Further, in accordance with this invention, all positioning functions connected with the required support and linear guidance of the magnetic heads are combined into the modular access mechanism that also represents a complete self-supporting unit. The modular access mechanism, however, does not have to be removed in order to change the track spacing.

The modular access mechanism is precisely aligned with the air bearing spindle similar to that of prior art servo track writers. However, the modular positioner does not require any further alignment other than to be placed each time against certain precision stops and fastened by two or more screws. This can be done rapidly thereby allowing the servo track writer to be ready for the new required track spacing.

The modular access mechanism is designed with the carriage overhanging the head supporting T-block on the side opposite to the spindle only. This provides a servo writer mechanism wherein no part of the carriage and/or rail need go below the recording disks. The disk pack shroud and the spindle can then be designed without any limitations imposed by the travel path of the carriage. As a result, the disk path can be mounted closer to the base plate and the disk-pack shroud may take the form of a simple cylindrical-shaped body extending to the timing disk enclosure. Openings in the disk-pack shroud may be eliminated except for the openings for the magnetic heads alone. Further improvements against known designs are achieved also in the design of the spindle sub-assembly.

Maintenance of the servo writer is a very important consideration since it is essential to keep the servo writer in operating condition at all times. The modular design of this invention makes it possible to readily replace a sub-assembly without affecting other parts of the machine.

The foregoing and other objects and advantages of the invention will no doubt become apparent to those of ordinary skill in the art after having read the following detailed disclosure of the preferred embodiment which is illustrated in several figures of the drawings.

DESCRIPTION OF THE PREFERRED EMBODIMENT

Figure 1:
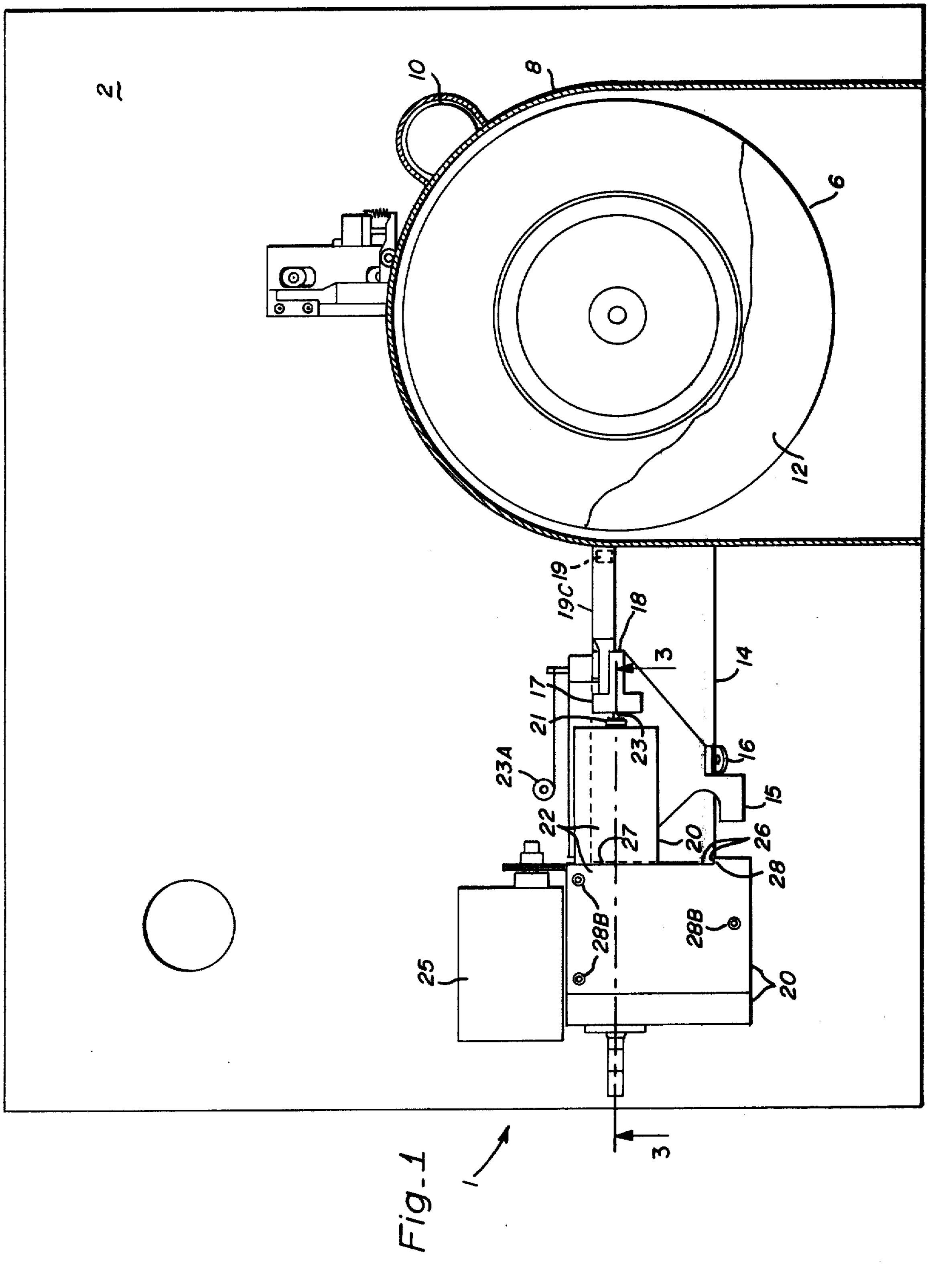
FIG. 1 shows a top view of a modular servo track writer with linear positioning in accord with the present invention, and with the head retracted from the record position on the servo surface.
Figure 2:
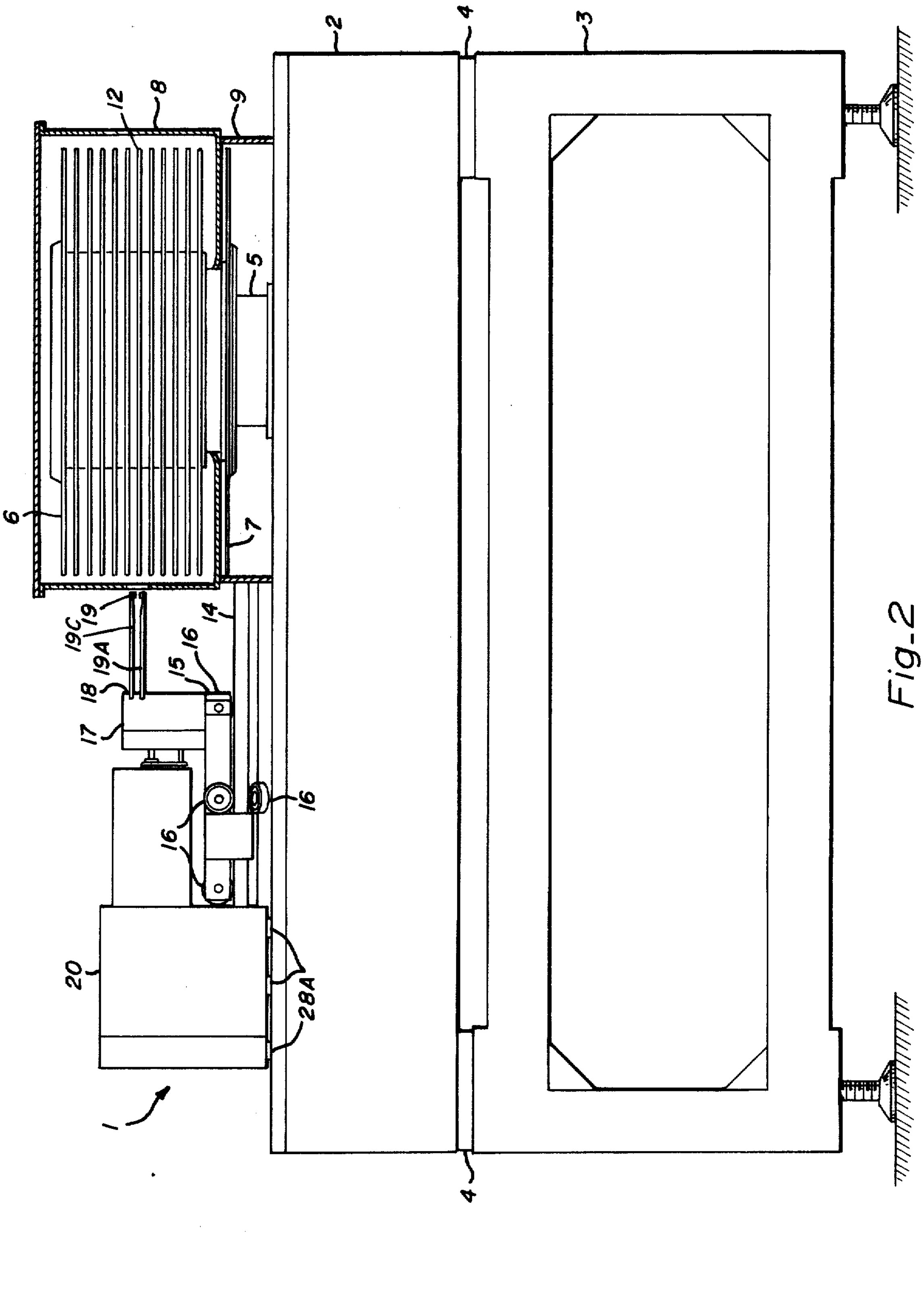
FIG. 2 shows a front view of the servo track writer of FIG. 1.

Referring to the drawings, an embodiment of a modular servo track writer machine with linear positioning and referred to in the drawings by the general reference character 1, is illustrated. The servo track writer 1 includes a rigid granite baseplate 2 (FIGS. 1 and 2) supported by a steel frame structure 3 (FIG. 2). The baseplate 2 and frame 3 are vibration insulated from each other by four rubber vibration dampening pads 4, positioned adjacent to each of the four corners of the baseplate. A precision air bearing spindle 5 is mounted about the topside of the baseplate 2. The spindle 5 has a mechanical interface on its top part to facilitate receipt and mounting of a removable type disk pack 6. The disk pack 6, as well known in the art, is structured for the purpose of writing (recording) servo tracks on the designated disk surface. Commercially available disk packs include those commonly referred to in the industry as 3336 disk packs. The spindle 5 also supports a timing disk 7 on which timing information is recorded. A U-shaped disk pack shroud 8 encloses the disk pack 6 on one side. The shroud 8 is positioned above a timing disk enclosure 9 and is open on one side such that the machine operator may readily insert or remove the disk pack 6 sidewise relative to the spindle 5 after the pack is slightly elevated above the spindle. To further facilitate operator handling of disk packs during mounting and/or removal, the spindle 5 is placed closer to one of the longitudinal sides of the baseplate 2 than to the other longitudinal side. In this manner, the operator's required reach distance in mounting and removing a disk pack on the spindle 5 is minimized. As illustrated in FIG. 1, an opening 10 is provided in the baseplate 2 to allow filtered air from a clean air system (not shown) to be directed into the shroud area about the disk pack. Clean air is desired to alleviate maloperation of the magnetic heads, which during machine operation are flying on a very thin air film on a servo disk surface 12.

Further mounted on the baseplate 2 is the modular access mechanism which includes a guiding rail 14 firmly mounted on the baseplate 2. A carriage 15 is mounted on the rail 14 for linear motion along the rail 14. Interface of the rail 14 and carriage 15 is provided by six small size ball bearings 16. A T-block 17, for supporting a magnetic head, is mounted firmly on the front side of the carriage 15 in such a way that the front face 18 of T-block 17 closest to the spindle 5 is substantially flush with that end of the carriage 15. This alleviates the need for any part of the carriage 15 of entering the area below the disk pack 6. Therefore, the timing disk enclosure 9 can be designed to extend straight from the bottom of the shroud 8 to the surface of the baseplate 2. The head mounting T-block supports a magnetic head arm assembly 19C including a servo magnetic head 19 for writing and/or reading tracks on the servo surface of the disk pack 6. The T-block further supports a dummy head 19A to neutralize the load force imposed on the servo surface of the disk 12 by the servo head 19. This is desirable to maintain the flatness of the servo surface disk substrate during operation. The head mounting T-block 17 and the travel path of the modular access mechanism are precisely aligned relative to the spindle 5, so that the magnetic air gap of the head 19 is in the proper alignment relationship with the removable disk pack 6 to be written and/or verified. It is not necessary to remove the modular access mechanism from the baseplate in order to change the track-to-track spacing.

Figure 3:
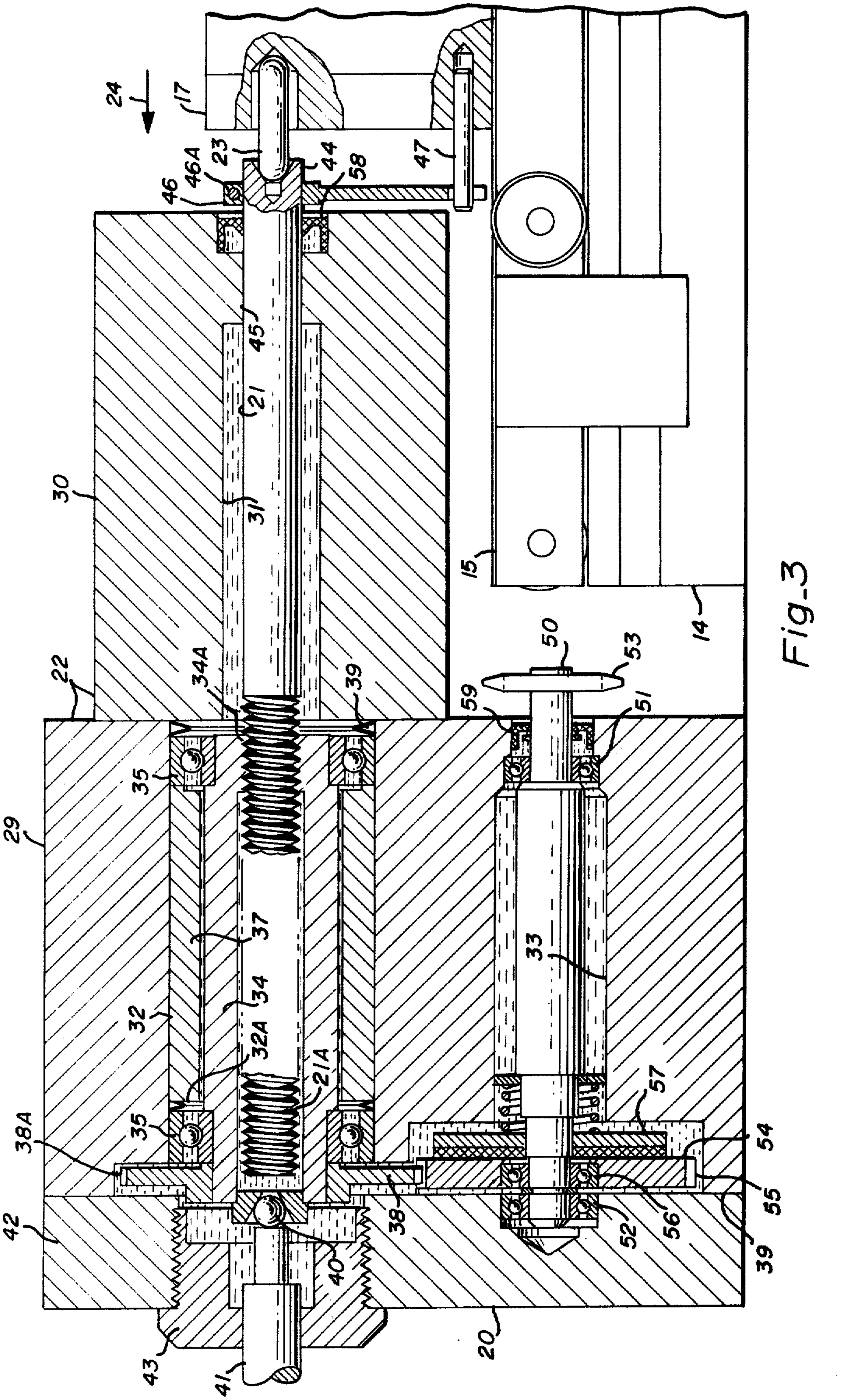
FIG. 3 shows a side sectional view of the modular positioner assembly of the servo track writer taken through the lines 3—3 of FIG. 1.

Further, mounted on the baseplate 2 is a modular positioner 20 illustrated in cross-section in FIG. 3. Positioner 20 contains the mechanism necessary to position the carriage 15 together with the T-block 17 and head 19 into the predetermined locations relative to the disk 12 on which the servo tracks are to be written. The modular positioner 20 is provided with a positioning screw or rod 21 extending from a modular positioner housing 22 and engaging a link 23. The link 23 has hemispherical end surfaces respectively engaging conical opening in the end of the positioning screw 21 and a conical opening in the T-block 17. A constant contact between the positioning rod 21 and the T-block 17 through the link 23 is assured by a commonly known negator spring 23A that pulls on the carriage 15 through a string arrangement at all times by a constant force in direction 24 towards the positioning rod 21.

Further, mounted on the baseplate 2 is a small drive motor 25 turning at a constant speed and providing the driving force moment necessary to drive the positioning mechanism of the modular positioner 20.

A key feature of the invention is presented by the method of removing and replacing the modular positioner 20. The housing 22 is provided with smoothly machined surfaces that interface with the precision stops 26 and 27 firmly connected with the guide rail 14. The precision stop 26 is a two-directional stop designed such that a corner 28 of the guide rail is defining the position of the housing 22 in two directions and the stop 27 is designed as another part of the guide rail 14 and provides a stop which, in combination with the stop 26, provides for precise angular alignment. In order to mount the housing 22 in proper position it is positioned over the baseplate 2. The housing 22, by its own weight, rests over the baseplate on three pads 28A, which define its relative elevational position. To precisely position the housing in the other two directions, it is then pushed by a slight force towards the stops 26 and 27. After the housing 22 is properly positioned, a set of triangularly spaced mounting screws 28B is tightened to secure the modular positioner in place relative to the baseplate 2 with the three mounting pads 28A (FIG. 1) intermediate the positioner and baseplate 2. The pads 28A are preferably arranged in a triangular configuration consistent with the orientation of the screws 28B to prevent mechanical distortion of the housing. All modular positioners used on a particular modular servo track writer have the same relative position of the positioning rod 21 relative to the housing surfaces that interface with stops 26 and 27, such that by mounting the housing 20 against the stops 26 and 27, a proper function of the modular servo track writer is assured.

Viewing FIG. 3, the modular positioner housing 22 is composed of two rigid steel blocks 29 and 30 rigidly connected together so as to present one solid unitary body. Block 30 is provided with a large opening 31. Block 29 has two openings 32 and 33 of which the axes are parallel relative to one another and in which the axis of the opening 32 is coaxial with the opening 31.

A hollow nut shaft 34 with fine precision internal threads 34A is mounted for rotation in the opening 32 on a pair of precision ball bearings 35. The ball bearings are preloaded against each other by a Belleville washer 32A and a sleeve 37. A detent gear 38 with gear teeth 38A is firmly attached to the nut shaft 34. The whole nut shaft subassembly, including the shaft 34 and bearings 35, is constantly being urged longitudinally by a Belleville washer type bias spring 39 against a ball 40 and a fine positioning translater 41. The translater 41 is firmly supported in a housing cover 42 through a sleeve 43. Translator 41 is a micrometer type device providing for fine alignment of the positioning system around a particular detent position of the nut shaft 34. The housing cover 42 is comprised of a transparent plastic material and covers the back side of housing 22, including the upper opening 32 and lower opening 33.

A precision screw shaft 21, with precision threads 21A is engaged in the precision threads 34A of the nut shaft 34. Shaft 21 is guided on the other side by a reduced diameter opening 45 in the housing block 30. The screw shaft 21 is prevented from turning by lock engaging arm 46. Arm 46 is firmly attached by a clamp screw 46A to the screw shaft 21 outside the housing block 30 and close to the end of the shaft 21. The mounting interface between arm 46 and screw shaft 21 is such that the relative angular position of the arm can be adjusted. The arm 46 bears against a pin 47 pressed into an opening in the T-block 17. Thus, the screw shaft 21 is prevented from changing its angular position while its axial position is dependent upon rotation of the nut shaft 34. A positive contact of the precision threads between the nut shaft 34 and screw shaft 21 is assured by the negator spring 23A force described above which is the same force that is providing the constant contact between the T-block 17, the link 23 and the screw shaft 41.

The lower opening 33 contains a drive shaft 50 mounted for rotation by one ball bearing 51 placed near one end of the opening 33 and another ball bearing assembly 52 placed coaxially in the cover 42. The shaft 50 is driven with a constant speed by sprocket 53. A drive gear 54 with teeth 55 is mounted for rotation on shaft 50 by a single ball bearing 56. The teeth 55 of drive gear 54 are intermeshed with gear 38. A friction clutch 57 provides a constant friction moment that turns the gears 38 and 54 as soon as a mechanical detenting system (later described) makes the gears free to change their angular positions.

The housing openings 31, 32, and 33 are filled with oil in order to decrease overall friction and wear of the mechanical parts. This is important to secure the required positioning precision for the life of the machine. Two oil seals 58 and 59 are used in order to prevent oil leakage from the openings 31 and 33.

Figure 5:
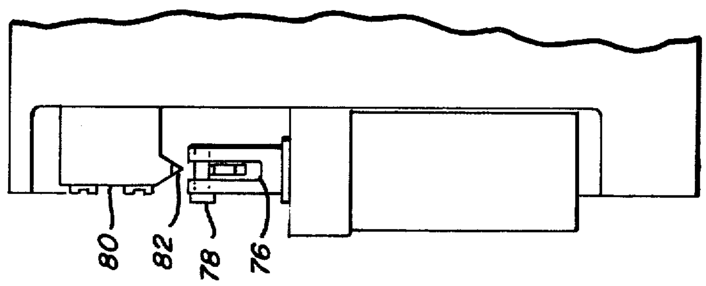
FIG. 5 shows a side view of the angular detent mechanism of FIG. 4.
Figure 4:
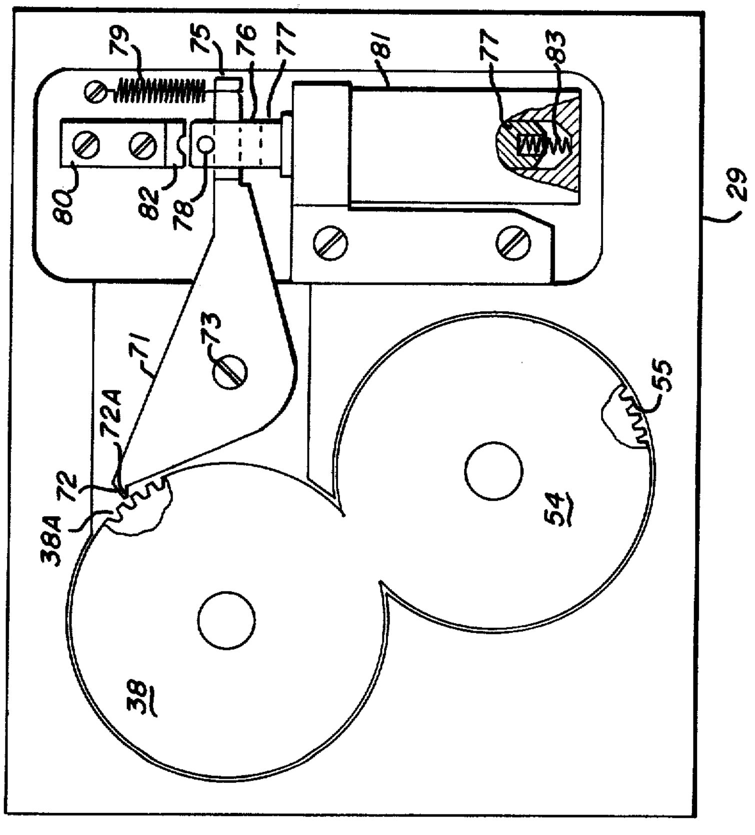
FIG. 4 shows a face view on the angular detent mechanism of the servo track writer of FIG. 1 with portions broken away for clarity.

The detent mechanism is shown in the face view in FIG. 4 and in the side view in FIG. 5. The detent gear 38 intermeshes with the drive gear 54. A detent pawl 71 with a detent face 72 is mounted on housing block 29 about a pivot point 73. The detenting face 72 of the pawl 71 engages the teeth 38A of the detent gear 38 in such a manner that a line perpendicular to the contact area of the detent face 72 and the tooth 38A goes through the pivot point 73 at the time of full detenting engagement. A solenoid housing 81 is mounted in a vertically adjustable fashion on housing block 29. An extension arm 75 of the pawl 71 extends through a slot 76 of a solenoid plunger 77. The top side of arm 75 is engaged at times by a round pin 78 positioned across the slot 76. The arm 75 is constantly biased upward by a coil spring 79 causing the detent face 72 and the nose 72A to follow the circumference of the teeth 38A and bringing eventually the face 72 into a full detenting relationship with the teeth 38A whereby the detenting wheel gear 38 is stopped in the desired angular position. The gear 38 is freed for rotation by an electromagnetic force being periodically applied between the solenoid housing 81 and the plunger 77 whereby the pin 78 engages with the arm 75. A plunger stop 80, with a wedge-shaped interface 82 is mounted in a vertically adjustable fashion on the housing block 29. Stop 80 defines the highest vertical position of the plunger 77. The wedge-type interface 82 while engaged centers the slot 76 in upper position so that the pawl arm 75 can move without interface contact with the surfaces of the slot 76. This is important for the required rapid and friction-free motion of the pawl 71 into the engagement position with the teeth 38A. Plunger 77 is constantly biased upward by a spring 83 positioned about the bottom end of the plunger 77. As a result, the plunger 77 is most of the time pressed upward against the wedge interface 82 by the spring 83 except for that time when the spring forces of the spring 79 and/or spring 83 are overcome by the electromagnetic force between the solenoid housing 81 and plunger 77 described above.

Although a single preferred embodiment of the present invention has been disclosed herein, it is contemplated that various modifications of the invention will become apparent to those skilled in the art after having read the foregoing description. Accordingly, it is intended that the description not be considered limiting, and that the appended claims be interpreted to cover all alterations and modifications thereof which fall within the true spirit and scope of the invention.

What is claimed is:

1. In a servo track writer system having at least one rotating disk with a servo information recording surface thereon and a transducer disposed for displacement relative to the disk for writing annular servo tracks on the disk, the combination comprising:

- a drive shaft defining a first axis therethrough adapted to be rotatably driven about said first axis;
- a drive means mounted on said drive shaft and being freely rotatable thereon;
- a clutch plate rotatably carried by said drive shaft and frictionally engaged with said drive means so as to be adapted to continuously rotate said drive means;
- an angularly movable member including means forming a first precision thread and having a detent wheel affixed thereto, said detent wheel including an outer surface that defines a diameter which is greater than the diameter of said first thread and having a plurality of detent teeth therearound, said angularly movable member being angularly movable about a second axis that is parallel to said first axis and spaced therefrom a distance so as to be angularly driven by said drive means;
- a linearly movable member including means forming a second precision thread, said means forming said first thread being engaged with said means forming said second thread, said linearly movable member being linearly movable along said second axis in response to angular movement of said angularly movable member so as to define a linear displacement;
- a detent pawl including a detent face arranged to selectively engage said outer surface of said detent wheel, said pawl being pivotally movable between a detent position wherein said face selectively engages said outer surface so as to inhibit angular motion of said angularly movable member and a free position wherein said face is out of contact with said detent wheel such that said angularly movable member is angularly driven by said drive means;
- means for selectively pivoting said detent pawl between said detent position and said free position so as to precisely control the angular position of said angularly movable member and consequently the linear displacement of said linearly movable member; and accessing means adapted to interface with said linearly movable member and adapted to support a transducer, said accessing means being responsive to said linear displacement whereby extremely accurate displacement of said transducer relative to said servo surface may be achieved.

2. In a servo track writer system, the combination as recited in claim 1 wherein said drive means comprises a drive gear.

3. In a servo track writer system, the combination as recited in claim 2 wherein said drive gear includes an outer periphery having a first plurality of teeth therearound, and said angularly movable member includes a second plurality of teeth therearound arranged to mesh with said first plurality of teeth.

4. In a servo track writer system, the combination as recited in claim 2 wherein said drive gear includes an outer periphery having a first plurality of teeth therearound, said detent wheel arranged such that said first plurality of teeth mesh with said detent teeth.

5. In a servo track writer system, the combination as recited in claim 1 and further comprising a supporting structure, a baseplate mounted on said supporting structure and including an opening therethrough, means for inhibiting vibrations from being transferred between said supporting structure and said baseplate, and a precision spindle extending through said opening and defining a mechanical interface adapted to receive a disk pack having at least one rotating disk therein.

6. In a servo track writer system, the combination as recited in claim 5 wherein said accessing means includes stationary guide means mounted on said baseplate and carriage means slidably carried by said guide means so as to be linearly movable therealong, said carriage means being adapted to support said transducer.

7. In a servo track writer system, the combination as recited in claim 6 including a housing having first and second openings therethrough, said drive shaft, said drive means and said clutch plate being disposed within said first opening, said angularly movable member and said linearly movable member being disposed within said second opening, and a plurality of precision stops arranged in two mutually perpendicular directions between said housing and said guide means to facilitate mounting said housing in a preselected alignment relative to said accessing means.

8. In a servo track writer system, the combination as recited in claim 5 including means for mechanically linking said linearly movable member to said accessing means.

9. In a servo track writer system, the combination as recited in claim 1 and further comprising means for preloading said linearly movable member against said angularly movable member with a substantially constant force.

10. In a servo track writer system, the combination as recited in claim 1 including a housing having first and second openings therethrough, said drive shaft, said drive means and said clutch plate being disposed within said first opening, said angularly movable member and said linearly movable member being disposed within said second opening, oil disposed within said first and second openings to reduce friction between the relatively moving parts, and means for sealing said oil within said openings.

11. In a servo track writer system, the combination as recited in claim 1 including a first housing, and means defining a pivot point for pivotally mounting said detent pawl to said first housing such that a line perpendicular to said detent face when it is in said detent position passes through said pivot point.

12. In a servo track writer system, the combination as recited in claim 11 wherein the end of said detent pawl opposite said detent face includes an extension arm and additionally including a plunger, a second housing mounted to said first housing for carrying said means for selectively pivoting, said second housing defining a slot therethrough for receiving said extension arm, and means for normally biasing said plunger such that said detent pawl is in said detent position.

13. In a servo track writer system, the combination as recited in claim 12 including means for stopping said plunger in a normal bias position, whereby when said means for selectively pivoting is actuated it forces said plunger away from said means for stopping, and thus out of said normal bias position, and against said extension arm, thereby causing said detent pawl to pivot into said free position.

14. In a servo track writer system, the combination as recited in claim 13 wherein said means for stopping is wedge-shaped and mounted on said housing in alignment with said slot, thereby tending to center said extension arm within said slot and thus mimize its frictional contact with said second housing.

15. In a servo track writer system, the combination as recited in claim 1 including means disposed on said accessing means for locking said linearly movable member to prevent angular movement thereof.

* * * * *